United States Patent [19]
Hori et al.

[11] Patent Number: 5,118,371
[45] Date of Patent: Jun. 2, 1992

[54] PROCESS AND APPARATUS FOR PRODUCING LAMINATED GLASS

[75] Inventors: Toshihiko Hori; Eitaro Nakamura, both of Kawasaki, Japan

[73] Assignee: Nippon Zeon Co., Ltd., Tokyo, Japan

[21] Appl. No.: 592,672

[22] Filed: Oct. 4, 1990

[30] Foreign Application Priority Data

Oct. 9, 1989 [JP] Japan .................. 1-263514

[51] Int. Cl.⁵ .................................. B32B 31/12
[52] U.S. Cl. ........................ 156/104; 156/99; 156/102; 156/295
[58] Field of Search ............ 156/99, 104, 295, 87, 156/102

[56] References Cited

U.S. PATENT DOCUMENTS

| | | | |
|---|---|---|---|
| 2,088,776 | 8/1937 | Dennison | 156/104 |
| 2,156,680 | 5/1939 | Dennison | 156/104 |
| 3,654,039 | 4/1972 | Bucher | 156/99 |
| 4,397,976 | 8/1983 | Mori et al. | 156/99 |
| 4,724,023 | 2/1988 | Marriott | 156/295 X |
| 4,927,480 | 5/1990 | Vaughan | 156/99 X |

FOREIGN PATENT DOCUMENTS

| | | |
|---|---|---|
| 2241754 | 1/1974 | Fed. Rep. of Germany . |
| 1255502 | 1/1961 | France . |
| 45151 | 2/1988 | Japan . |
| 134539 | 6/1988 | Japan . |
| 00176 | 11/1984 | PCT Int'l Appl. . |
| 781361 | 8/1957 | United Kingdom . |
| 2058662 | 4/1981 | United Kingdom . |

OTHER PUBLICATIONS

Hawley's Condensed Chemical Dictionary, 11th Edition, Van Nostrand Reinhold, 1987, p. 926.
Patent Abstracts of Japan, vol. 7, nr. 43, p. 19; Jun. 7th, 1988; & JP-A-63-134539.

*Primary Examiner*—Michael W. Ball
*Assistant Examiner*—Francis J. Lorin
*Attorney, Agent, or Firm*—Webb, Burden, Ziesenheim & Webb

[57] ABSTRACT

A process and apparatus for producing laminated glass wherein a film-forming plastisol is coated on a surface of a first glass plate to form a layer of the plastisol so that the thickness of the layer may monotonically vary; a second glass plate which has been heated at least at its peripheral portions is brought in contact with the layer of the plastisol first at a portion where the layer is the thickest and thereafter at portions where the layer is thinner, thereby gradually laminating the glass plates to each other while causing the plastisol to lose its fluidity at portions where is comes in contact with the heated second glass plate; and the laminated glass plates is heated under pressure so that the plastisol gelates. The process and apparatus are productive of laminated glass of high quality in high productivity.

6 Claims, 4 Drawing Sheets

① MAX. PHYSICAL PROPERTY-REALIZING TEMP. (MIN. MELTING TEMP.)

② SOLIDIFYING TEMP.

③ FLUIDITY-LOSING TEMP.

④ SWELLING-STARTING TEMP.

PROCESS AND APPARATUS FOR PRODUCING LAMINATED GLASS

FIELD OF THE INVENTION

The invention relates to a process for producing laminated glass involving the steps of the formation of a plastisol layer between each adjacent pair of glass plates of a plurality of glass plates and the gelation of the plastisol layer. It also relates to an apparatus for carrying out the process.

BACKGROUND OF THE INVENTION

Laminated glass has heretofore been generally manufactured by a process wherein a stack of at least two sheets of glass having a plastic film called an intermediate film typically a plasticized polyvinyl butylal film sandwiched between each pair of adjacent sheets of glass is subjected to evacuation, pressing and heating. Such a process, however, has involved a problem that the productivity is low and the manufacturing costs are expensive because the process requires a lot of steps and time.

JP A 63-134539 discloses a process for producing laminated glass comprising coating a film-forming plastisol based on an epoxy group-containing vinyl chloride resin on at least one surface of a first glass plate to form a layer of the plastisol on the first glass plate, laminating a second glass plate which may have a plastisol layer on at least one surface thereof onto the first plastisol film-coated glass plate with the plastisol layer or layers being sandwiched between the first and second glass plates, and heating the laminated first and second glass plates under pressure so that the plastisol fully gelates. This process obviates various steps associated with the use of a preformed plastic film, including washing, drying, cutting and conditioning of films as well as a step of pressing laminated glass plates in an autoclave, making it possible to carry out a series of manufacturing steps on a continuous production line, whereby laminated glass may be manufactured in high productivity.

In this process, however, the surface of the plastisol layer formed on a glass plate is frequently deformed owing to surface tension to form depressions. When another glass plate is laminated to the glass plates having the depressed plastisol layer, the laminated glass plates undesirably contains air occluded in the depressions of the plastic layer, resulting in the product of poor quality.

If the second glass plated is laminated to the first glass having a layer of the plastisol which is still fluid, precise positioning of the glass plates is not easy on the one hand and the plastisol may overflow out of the peripheries of the glass plates, hindering precise control of the thickness of the plastisol film, on the other hand. Those portions of the plastisol films which have bulged out of the peripheries of the glass plates must be removed at a later stage.

OBJECT OF THE INVENTION

An object of the invention is to provide a process for producing laminated glass in which a glass plate having a layer of a film-forming plastisol on a surface thereof may be laminated to another glass plate so that the layer of the plastisol may be sandwiched between the glass plates without air included and without bulging of the plastisol out of the peripheries of the glass plates, whereby positioning and lamination of the glass plates may be carried out exactly and easily. Another object of the invention is to provide an apparatus for carrying out the process.

SUMMARY OF THE INVENTION

A process for producing laminated glass according to the invention comprises:

coating a film-forming plastisol on a surface of a first glass plate to form a layer of the plastisol so that the thickness of the layer may monotonically vary, bringing a second glass plate which has been heated at least at its peripheral portions in contact with the layer of the plastisol formed on the first glass plate first at a portion where the layer is the thickest and thereafter at portions where the layer is thinner, thereby gradually laminating the glass plates to each other while causing the plastisol to lose its fluidity at portions where it comes in contact with the heated second glass plate, and heating the laminated glass plates under pressure so that the plastisol gelates.

An apparatus for producing laminated glass according to the invention comprises:

a means for coating a film-forming plastisol on a surface of a first glass plate to form a layer of the plastisol so that the thickness of the layer may monotonically vary, a means for bringing a second glass plate which has been heated at least at its peripheral portions in contact with the layer of the plastisol formed on the first glass plate first at a portion where the layer is the thickest and thereafter at portions where the layer is thinner, thereby gradually laminating the glass plates to each other while causing the plastisol to lose its fluidity at portions where it comes in contact with the heated second glass plate, and a means for heating the laminated glass plates under pressure so that the plastisol gelates.

In the process and apparatus according to the invention, a layer of a film-forming plastisol is formed on a surface of a first glass plate so that the thickness of the layer may monotonically varies, and a second glass plate which has been heated at least at its peripheral portions is brought in contact with the layer of the plastisol first at a portion where the layer is the thickest and thereafter at portions where the layer is thinner. Thus, the step of laminating the glass plates is always carried out so that any air involved may be effectively driven out.

Since the second glass plate which has been heated to a temperature sufficient so that the plastisol partially gelates, when it is brought in contact the layer of the plastisol, the plastisol coming in contact with the heated second glass plate starts to gelate losing its fluidity, whereby bulging the plastisol out of the peripheries of the glass plates can be prevented. In addition, faultly positioning of the glass plates and variations of the thickness of the gelated plastisol film may be minimized.

DETAILED DESCRIPTION OF THE INVENTION

Figure 1:
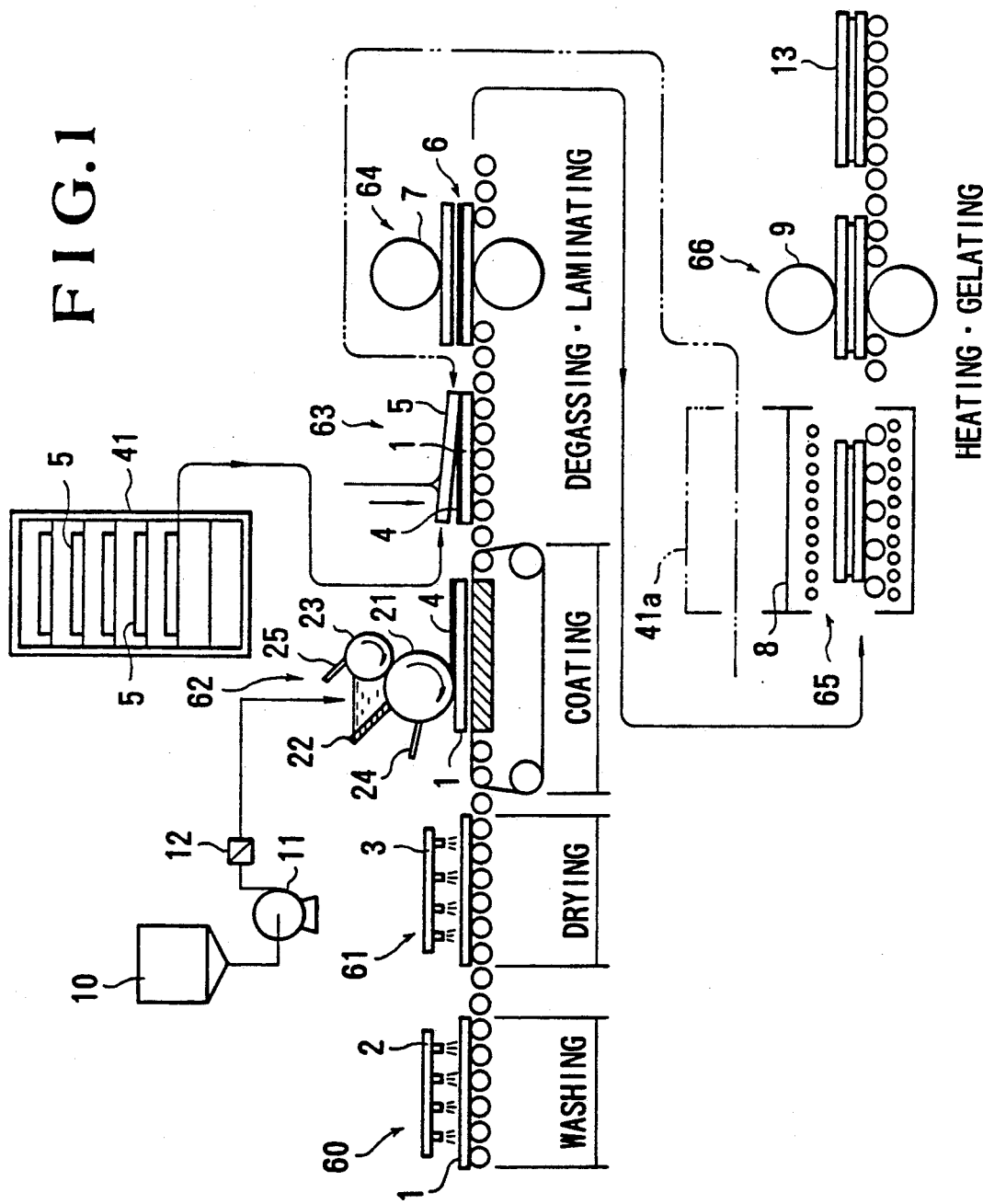
Figure 2A:
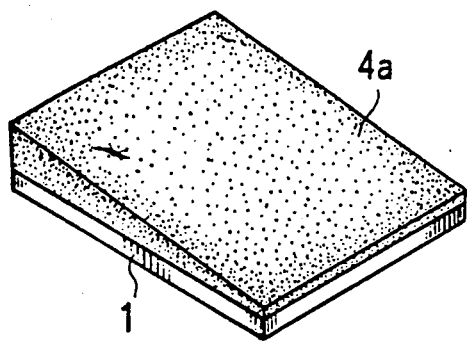
Figure 2B:
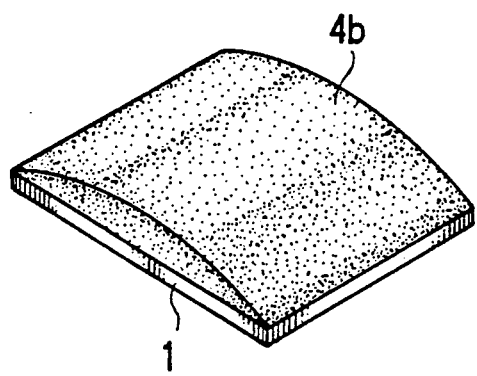
Figure 2C:
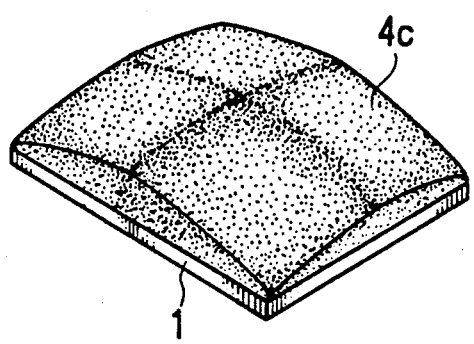
Figure 3A:
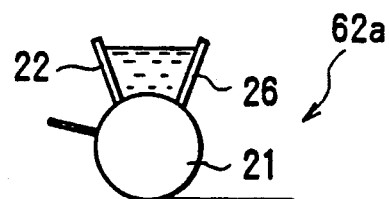
Figure 3B:
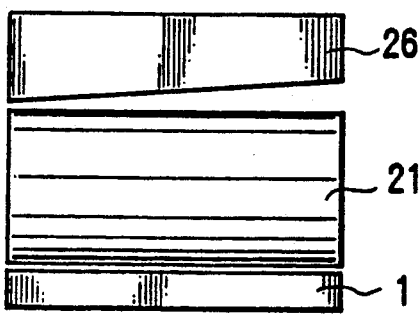
Figure 3C:
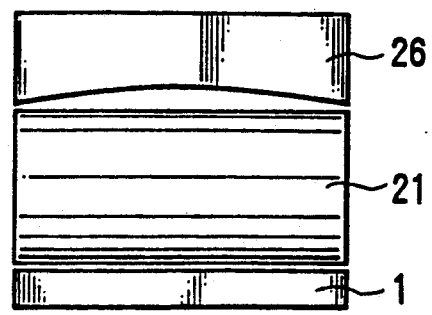
Figure 4A:
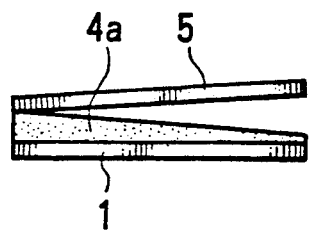
Figure 4B:
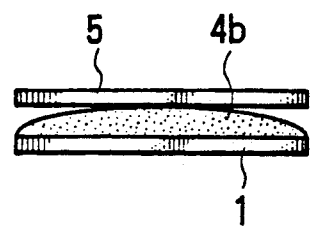
Figure 4C:
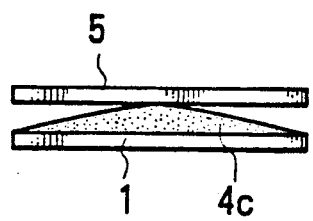
Figure 5A:
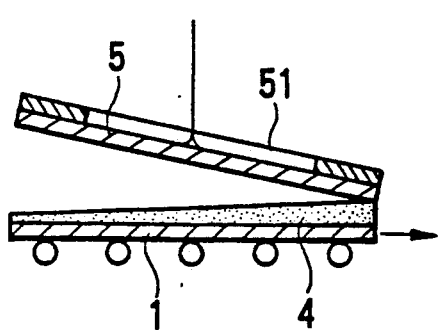
Figure 5B:
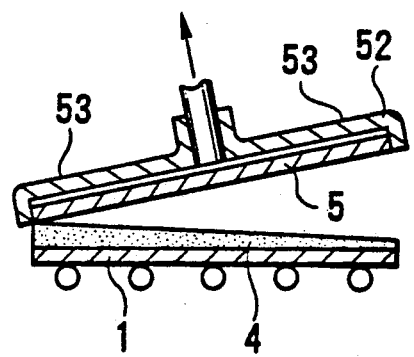
Figure 6:
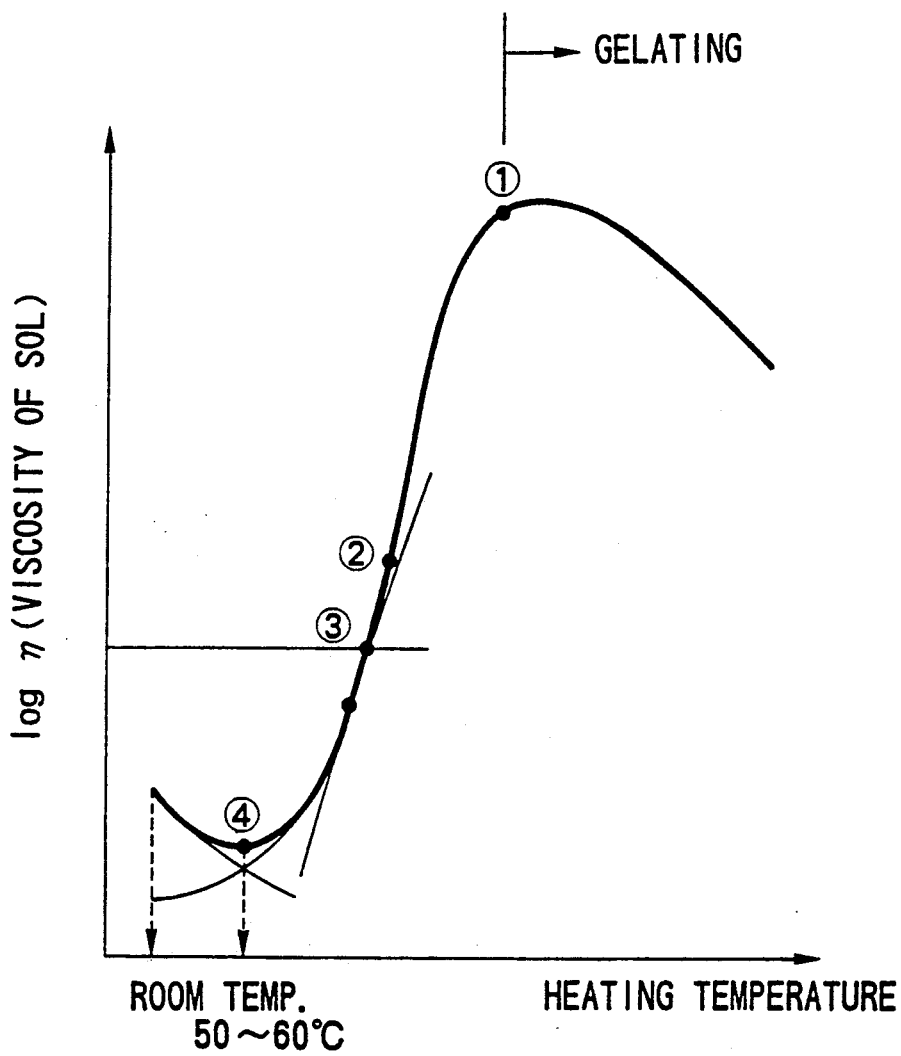

Preferred embodiments of the invention are illustrated in detail with reference to attached drawings, in which:

FIG. 1 is a schematic diagram showing an outline of an apparatus for manufacturing laminated glass according to the invention;

FIG. 2 (a), (b) and (c) are perspective views showing examples of glass plates each having a plastisol layer;

FIG. 3 (a), (b) and (c) are schematic diagrams of coating devices in other embodiments of the invention;

FIG. 4 (a), (b) and (c) are side views of plastisol-coated glass plates;

FIG. 5 (a) and (b) are schematic sectional views of laminating devices which can be used herein; and FIG. 6 is a graph showing a gelation process of a plastisol layer.

First, there is illustrated an outline of one embodiment of an apparatus with which the process of the present invention is practiced. The illustrated apparatus comprises devices successively installed in sequence. That is to say, these devices are as follows: a washing device 60 which sprays washing water on a glass plate 1; a drying device 61 which blows hot clean air 3 against the washed glass plate 1; a coating device 62 by which the glass plate 1 is coated with a film-forming plastisol to form a plastisol layer 4; a laminating device 63 which forms a glass laminate 6 by closely contacting another glass plate 5 with the glass plate 1 having the plastisol layer 4; a thickness-correcting device 64 equipped with rolls 7 which adjust the thickness of the glass laminate 6; a heating and gelating device 65 equipped with a heating furnace 8 which heats the glass laminate 6; a cooling device 66 equipped with cooling rolls 9; etc. Glass plates are sequentially passed through these devices to finally produce a laminated glass 13.

In the coating device 62, a plastisol stored in a tank 10 is fed to a coating part by a pump 11 through a strainer 12. A reverse roll coater is adopted as coating means at the coating part. That is, there is disposed a reverse roll 21 in contact with the surface of the glass plate 1. The rotation direction of the reverse roll 21 is so designed that it is reverse to the transfer direction of the glass plate 1 at the part where the reverse roll 21 faces the glass plate 1. A reserve plate 22 is disposed on the peripheral surface of the reverse roll 21 while brought into contact with the roll, and a metering roll 23 opposing the reserve plate 22 with a constant distance is so disposed that it has a certain gap with the reverse roll 21. The above-mentioned plastisol is fed into the space between the reserve plate 22 and the metering roll 23, and stored there. In addition, the numerals 24 and 25 in the figure each designate a doctor blade which scrapes down the plastisol (not to be used) adhering to the peripheral surface of either the reverse roll 21 or the metering roll 23.

The reverse roll 21 is so controlled that its rotation speed can be set at any desired magnitude. The thickness of the plastisol layer with which the glass plate 1 is coated, as shown in FIG. 2 (a) or FIG. 2 (b), is controlled by adjusting the rotation speed of the reverse roll 21. That is, FIG. 2 (a) shows an example of a sectionally wedge-formed plastisol 4a with which the glass plate 1 is coated, and the coating thickness of the plastisol 4a linearly increases from the front side (right side in FIG. 2 (a)) in the transfer direction of the glass plate 1 to the back side. FIG. 2 (b) shows an example of a sectionally dome-formed plastisol 4b with which the glass plate is coated, and the coating thickness of the plastisol 4b curvilinearly increases once from the front side (right side in FIG. 2 (b)) in the transfer direction of the glass plate 1 to the central part thereof, and then curvilinearly decreases from the central part to the back side.

The plastisol 4a having a linearly changing thickness as shown in FIG. 2 (a) may also be obtained by arranging the reverse roll 21 in such a manner that it is inclined to the glass plate 1 to form a distance between the reverse roll 21 and the glass plate 1, the amount of the distance changing in the axial direction of the reverse roll 21.

Furthermore, there may also be formed a plastisol 4c having a pyramidal form as shown in FIG. 2 (c) by using other coating means such as a mold at the above-mentioned coating part.

Still furthermore, the plastisol 4a having a linearly changing thickness as shown in FIG. 2 (a) may also be similarly formed by using a coating device 62a as shown in FIG. 3 (a) and (b) wherein a blade member 26 is employed in place of the metering roll 23 in the above embodiment, and at the same time the length of the distance in the width direction between the blade part 26 and reverse roll 21 is linearly changed. In this case, the plastisol 4 (b) having a curvilinearly changing thickness as shown in FIG. 2 (b) may also be similarly formed by curvilinearly changing in the width direction the length of the distance between the blade part 26 and the reverse roll 21, as shown in FIG. 3 (c).

The process of the invention is illustrated again by using FIG. 1 again. The glass plate 1 having the plastisol layer 4 having been formed by the coating device 62 is transferred to the laminating device 63.

The laminating device 63 is equipped with a heating furnace 41 for heating the other glass plate 5 different from the glass plate 1 coated with the plastisol layer 4. The glass plate 5 taken out from the heating furnace 41 is stacked on the glass plate 1 having the plastisol layer 4.

The glass plate 5 to be stacked on the glass plate 1 having the plastisol layer 4 is heated to a predetermined temperature, and therefore the plastisol layer 4, when continuously contacted from one portion to another with the glass plate 5 heated to high temperature, becomes successively gel at the contacted portion, thus the plastisol losing fluidity due to the increase in its viscosity and showing no leakage of the plastisol from the periphery of the glass plate. Moreover, the stacked glass plate does not deviate from the position of the glass plate 1 after stacking, and the resultant plastisol film shows a decreased change in its thickness.

In the present invention, since the plastisol layer 4 is formed on the glass plate 1 in such a manner that its thickness changes, the glass plate 5 transferred to the laminating device 63 is contacted with the plastisol layer 4a, 4b or 4c shown in FIG. 4 (a), (b) or (c), respectively, with which the glass plate 1 is coated, continuously from the thicker portion to the thinner portion thereof. During the contact, both the glass plate 1 and the glass plate 5 are closely contacted each other continuously from the portion where the corresponding intermediate portion of the plastisol layer 4a, 4b or 4c is thicker to the portion where the corresponding portion thereof is thinner. As a result, air existing between the plastisol layer 4a, 4b or 4c and the glass plate 5 is always purged away outside from the contacted portion, and the glass laminate is formed in a state without bubbles, because the plastisol layer 4a, 4b or 4c before heated by the glass plated 5 has fluidity.

In the plastisol at room temperature, though the surface of the resin particles is slightly solvated owing to a plasticizer present in the plastisol, the sol particles move mutually freely, and flow as viscous sol. When the plastisol is heated, swelling of the resin particles progresses to high degree, and the resin particles dissolve together on the surface and solidify, thus the plastisol already losing its fluidity and becoming to a plastic layer. The plastic layer at this stage has poor physical strength due to insufficient gelation caused by incomplete thermal transmission to the core of the resin particles. The plastic layer at this stage has no surface gloss, and it is semi-transparent. When the plastisol is further sufficiently heated to completely gelate and become in a molten state, the entire resin particles completely gelate and swell to the core, and at the same time they are melted and flow. As a result, the solvated PVC molecules show vigorous micro Brownian movement, and molecular entanglement among particles become increased, resulting in the maximum physical strength of the plastisol. In this case, the plastisol has surface gloss, and become transparent. An example of the relation between heating temperature and viscosity of plastisol is shown in FIG. 6. The relation between heating plastisol and its gelation is illustrated in detail in a paper (Rubber Digest, 19, 1, 81-92 (1967)).

In the laminating process performed by the device 63, the heating temperature and laminating rate of the glass plate 5 are determined in such a manner that the plastisol layer 4 on the glass plate 1 loses its fluidity and does not leak from the periphery of the glass plates 1, 5 when the plastisol layer 4 is contacted with the heated glass plate 5. Though the heating temperature of the glass plate 5 depend on the composition of the film 4 and laminating rate, the preferable temperature is usually 100 to 200° C.

In addition, the heating furnace 8 of the heating and gelating device is designed, for example, in two stages as shown by a two dot line in FIG. 1, and the thus formed heating furnace 41a can be used for the heating furnace 41 employed in the laminating device 63 mentioned above. As a result, the laminating device 63 as a whole becomes a simple system due to the omission of the heating furnace 41.

Moreover, it is possible to preheat the periphery of the glass plate 5 to be stacked on the glass plate 1 having the plastisol layer 4. Devices shown in FIG. 5 (a) and (b) are useful as the periphery-heating devices. In the device shown in FIG. 5 (a), a plane heater 51 is placed on the periphery of glass plate 5 to be stacked on the glass plate 1 having the plastisol layer 4. In the device shown in FIG. 5 (b), the glass plate 5 to be stacked on the glass plate 1 having the plastisol layer 4 is fixed to a heater main body 52 of air suction type, and a heater 53 is arranged at the periphery of the heater main body 52 mentioned above. Further, a far IR-ray heater may be installed at a position apart from the periphery of the glass plate 5, with a constant distance, to be stacked on the glass plate 1 having the plastisol layer 4.

After forming the glass laminate 6 by the laminating device 63, the glass laminate 6 is transferred to the thickness correcting device 64 shown in FIG. 1. The thickness-correcting device 64 controls the thickness of the plastisol layer 4. The thickness-correcting device 64 may become unnecessary if the thickness of the plastisol layer 4 is controlled to become constant while the glass plate 5 is being positioned during the lamination of the glass plate 5 on the plastisol layer by means of the laminating device 63.

In the heating and gelating device 65, the glass laminate 6 is heated, and the plastisol layer 4 existing between the glass plate 1 and glass plate 5 completely gelate. When gelation of the plastisol layer 4 is insufficient, the resultant laminated glass shows low transparency and insufficient adhesion and penetration-resistant strength. Accordingly, the heating temperature and heating time of the glass laminate in the heating furnace 8 is determined to avoid manufacture of unsatisfactory laminated glass as described above. Concretely, usual heating temperature is preferably 110° to 230° C., and usual heating time is preferably 1 second to 30 minutes, though they depend on the composition and thickness of the plastisol layer 4, method for heating the plastisol layer 4 and other factors.

The film-forming plastisol which can be used herein is based on a polymer which is capable of adhering to glass and which, when heated under suitable conditions, is partially cured without being molten. A preferred plastisol is based on an epoxy group-containing vinyl chloride resin having a polymerization degree of from about 600 to 3000 and an epoxy resin content of at least 0.5% by weight. Such an epoxy group-containing vinyl chloride resin is described in detail in JP A 63-134539.

The epoxy group-containing vinyl chloride resin may be a copolymer of vinyl chloride, an epoxy group-containing monomer and optionally a minor amount (up to 20 mol %) of a third copolymerizable monomer. Examples of the epoxy group-containing monomer include, for example, glycidyl ethers of unsaturated alcohols, such as allyl glycidyl ether and methallyl glycidyl ether; glycidyl esters of unsaturated acids, such as glycidyl methacrylate, glycidyl acrylate, glycidyl p-vinylbenzoate, methyl glycidyl itaconate, glycidyl ethyl maleate, glycidyl vinyl sulfonate and glycidyl (meth)allyl sulfonate; and epoxyolefins, such as butadiene monoxide, vinylcyclohexene monoxide 2-methyl-5,6-epoxyhexene. Examples of the third comonomer copolymerizable with vinyl chloride and the epoxy group-containing monomer include, for example, vinyl esters of fatty acids, such as vinyl acetate and vinyl propionate; olefins such as ethylene and propylene; vinylidene halides, such as vinylidene chloride and vinylidene fluoride; vinyl ethers, such as isobutyl vinyl ether, methyl vinyl ether and cetyl vinyl ether; and allyl compounds such as allyl chloride and methyl allyl ether.

The vinyl chloride copolymers used in the invention may be obtained from these monomers by emulsion polymerization or microsuspension polymerization which are highly evaluated as processes for manufacturing vinyl chloride resins for paste.

The epoxy group-containing vinyl chloride resin which can be used herein may also be prepared by epoxidation of a vinyl chloride resin (a polymer or copolymer of vinyl chloride). Typical process for epoxidation of a vinyl chloride resin includes a step of dechlorination of a vinyl chloride resin, preferably that for use in producing a paste, by heat treatment or by contacting with alkali, followed by epoxidation of the dechlorinated vinyl chloride resin with an organic peracid.

Alternately, the epoxy group-containing vinyl chloride resin which can be used herein may be a blend of a vinyl chloride resin (a polymer or copolymer of vinyl chloride) and an epoxy group-containing resin (a polymer or copolymer of an epoxy group-containing monomer) compatible with the vinyl chloride resin.

The epoxy group-containing vinyl chloride resins are required to contain at least 0.5% by weight of the epoxy group based on the weight of the resin. Otherwise, they tend to have insufficient adhesion to glass. The content of the epoxy group of the resin is normally from 0.5 to 10% by weight, preferably from 0.5 to 2.0% by weight.

The polymerization degree of the epoxy group-containing vinyl chloride resins is desirably 600 to 3,000. In the case of the polymerization degree being less than 600, the penetration-resistant strength of the laminated glass plate of the invention lowers when the epoxy group-containing vinyl chloride resin content in the intermediate film thereof is high. In the case of the polymerization degree being greater than 3,000, gelation of the plastisol requires an excessive amount of heat energy, resulting in coloring of the plastisol as well as lowering of the productivity. A large amount of stabilizer has to be used in order to avoid the coloring, resulting in increasing the manufacture cost of the laminated glass plate.

In general, so-called plasticizers for vinyl chloride can be widely used for plasticizers which the plastisol of the invention comprises. Examples of the plasticizers include aliphatic acid type plasticizers such as dioctyl adipate, butyl diglycol adipate, dioctyl azelate, dibutyl sebacate and diisodecyl adipate, phthalic acid type plasticizers such as dioctyl phthalate, dibutyl phthalate, diisobutyl phthalate, butyl benzyl phthalate, dilauryl phthalate and diheptyl phthalate, phosphoric acid type plasticizers such as trixylenyl phosphate, tricresyl phosphate, cresyl diphenyl phosphate, trischloroethyl phosphate, trischloroethyl phosphite and tributyl phosphite. Examples of the epoxy derivatives include epoxidized bean oil and epoxy aliphatic acid monoester. Polyester type plasticizers may also be used in some cases. The plastisol of the invention comprises preferably 20 to 80 parts by weight of the plasticizer based on 100 parts by weight of the vinyl chloride resin. When the plasticizer content is high, the film strength of the plastisol becomes low after gelation. When the content is low, the film hardness becomes high, and in addition ensurance of the plastisol fluidity becomes impossible.

The plastisol of the invention preferably further comprises a thermal stabilizer and an UV-ray absorber.

Examples of the thermal stabilizer include alkyltin compounds of aliphatic acids such as butyltin laurate, butyltin maleate and octyltin maleate, and alkyltin-containing sulfur compounds such as bis(isooctyl thioglycolate) salt of di-noctyltin. Metallic soap type stabilizers may also be used in combination with these compounds.

Examples of excellent UV-ray absorbers include 2-(2'-hydroxy-5'-methylphenyl)benzotriazole, 2-(2'-hydroxy-3'-tertbutyl-5'-methylphenyl)-5-chlorobenzotriazole, 2-(2'-hydroxy-3',5'-tert-butylphenyl)-5-chlorobenzotriazole and 2-(2'-hydroxy-4'-octoxyphenyl)benzotriazole.

The plastisol may also contain, if necessary, additives such as antioxidants, lubricants, fillers and dyes. Examples of excellent antioxidants include phenolic antioxidants such as 2,6-di-tert-butyl-p-cresol, 2,2'-methylenebis(4-methyl-6-tert-butylphenol), 4,4'-butylidenebis(3-methyl-6-tert-butylphenol) and 4,4'-thiobis(3-methyl-6-tert-butylphenol).

Furthermore, the plastisol may be incorporated, if necessary, with other substances such as a vinyl chloride resin (containing no epoxy group) for paste manufacture, a resin (e.g. an acrylic resin) mutually soluble with a vinyl chloride resin, a crosslinking agent, a thickner, a diluent, a coupling agent of silane type and titanate type.

Preparation of the plastisol is carried out by a conventional method wherein a resin is mixed with a plasticizer and other required substances, and the resulting mixture is degassed. The plastisol is in a liquid state, and therefore dust and foreign materials may be simply removed by filteration. Storing and transportation of the plastisol can be conducted in a closed system such as tanks and pipelines. As a result, its quality is easily controlled, and its treatment is adapted for automation.

Furthermore, the present invention is not restricted to the embodiments described above, and can be improved or modified within the scope of the appended claims.

For example, the laminating device is not restricted to the one shown in FIG. 1, and any means may be employed so long as it can laminate the glass plate 5 on the plastisol layer at a predetermined laminating rate and angle.

EFFECT OF THE INVENTION

In the process and apparatus according to the invention, a layer of a film-forming plastisol is formed on a surface of a first glass plate so that the thickness of the layer may monotonically varies, and a second glass plate which has been heated at least at its peripheral portions is brought in contact with the layer of the plastisol first at a portion where the layer is the thickest and thereafter at portions where the layer is thinner. Thus, the step of laminating the glass plates is always carried out so that any air involved may be effectively driven out.

Since the second glass plate which has been heated to a temperature sufficient so that the plastisol partially gelates, when it is brought in contact the layer of the plastisol, the plastisol coming in contact with the heated second glass plate starts to gelate losing its fluidity, whereby bulging the plastisol out of the peripheries of the glass plated can be prevented. In addition, fault positioning of the glass plates and variations of the thickness of the gelated plastisol film may be minimized. Accordingly, the process and apparatus according to the invention are productive of laminated glass of high quality in high productivity.

EXAMPLES

The invention will be further illustrated with reference to the following Examples, Reference Examples and Comparative Examples, in which "parts" and "%" are by weight unless otherwise specified.

First, plastisol A and plastisol B were prepared.

Plastisol A was obtained by mixing 100 parts of an epoxy group-containing vinyl chloride resin (a copolymer of 97% of vinyl chloride and 3% of glycidyl methacrylate) having an average polymerization degree of 1,400 and an average particle size of 1 $\mu$m with 45 parts of dioctyl adipate, 15 parts of dioctyl phthalate, 4 parts of dibutyltin polymercaptide and 0.3 part of 2,2-methylenebis(4-methyl-6-tert-butylphenol) by a Hovert mixer, reducing the ambient pressure of the mixture, and degassing. The resultant plastisol A had a viscosity of 4,500 cP at 23° C.

Plastisol B was obtained by mixing 100 parts of an epoxy group-containing vinyl chloride resin (a copolymer of 93% of vinyl chloride and 7% of glycidyl methacrylate) having an average polymerization degree of 1,000 and an average particle size of 1 $\mu$m with 45 parts of dioctyl adipate, 15 parts of dioctyl phthalate, 4 parts of dibutyltin polymercaptide and 0.3 part of 2,2-methylenebis(4-methyl-6-tert-butylphenol) by a Hovert mixer, reducing the ambient pressure of the mixture, and degassing. The resultant plastisol B had a viscosity of 9,000 cP at 23° C.

EXAMPLE 1

Glass plates each having a size of 200×200×3 mm were used. Each glass plate was coated with plastisol A or plastisol B to form a plastisol layer 4a having a wedge-formed section as shown in FIG. 4 (a), the plastisol layer 4a having a linearly changing thickness of 0.8 mm to 1.4 mm. Another glass plate (upper glass plate) having a size of 200×200×3 mm and heated at 180° C. in an oven was so positioned above the glass plate (lower glass plate) having the plastisol layer 4a that one of the edge sides of the upper glass plate was 1 mm apart (high) from one of the edge sides, where the thickest part of the plastisol layer 4a existed, of the lower glass plate, and that the upper glass plate was inclined to make an angle of 11 degree with the lower glass plate. The upper glass plate was then gradually declined over a period of about 8 seconds with force on the plastisol layer on the lower glass plate to become parallel to the lower glass plate, and the laminated state of the two glass plates was maintained for 30 seconds.

Three pieces of such glass laminates were prepared for each plastisol, and leakage of the plastisol from the periphery of the laminated glass plates and wrinkles on the plastisol layer were observed. The results are shown in Table 1.

In Table 1, the listed marks denote the following results: mark O signifies that no plastisol leakage from the periphery of the laminated glass plates was observed, or no wrinkle on the plastisol layer was observed; mark X signifies a meaning contrary to that of mark O; and mark Δ signifies that slight leakage or wrinkle formation was observed.

EXAMPLE 2

Example 1 was repeated except that the upper glass plate was heated to 160° C. The results are shown in Table 1.

EXAMPLE 3

Example 1 was repeated except that the upper glass plate was heated to 140° C. The results are shown in Table 1.

EXAMPLE 4

Example 1 was repeated except that the upper glass plate was heated to 120° C. The results are shown in Table 1.

EXAMPLE 5

The procedure of Example 1 was repeated except that the upper glass plate was uniformly heated in an oven at first and then the periphery thereof was further heated by placing a heater at the periphery thereof and heating, thus the upper glass plate having a central temperature of 150° C. and a peripheral temperature of 200° C. The results are shown in Table 1.

EXAMPLE 6

The procedure of Example 1 was repeated except that the upper glass plate was uniformly heated in an oven at first and then the periphery thereof was further heated by placing a heater at the periphery and heating, thus the upper glass plate having a central temperature of 150° C. and a peripheral temperature of 180° C. The results are shown in Table 1.

EXAMPLE 7

The procedure of Example 1 was repeated except that the upper glass plate was uniformly heated in an oven at first and then the periphery thereof was further heated by placing a heater at the periphery and heating, thus the upper glass plate having a central temperature of 150° C. and a peripheral temperature of 160° C. The results are shown in Table 1.

EXAMPLE 8

The procedure of Example 1 was repeated except that the upper glass plate was uniformly heated in an oven at first and then the periphery thereof was further heated by placing a heater at the periphery and heating, thus the upper glass plate having a central temperature of 130° C. and a peripheral temperature of 180° C. The results are shown in Table 1.

EXAMPLE 9

The procedure of Example 1 was repeated except that the upper glass plate was uniformly heated in an oven at first and then the periphery thereof was further heated by placing a heater at the periphery and heating, thus the upper glass plate having a central temperature of 130° C. and a peripheral temperature of 160° C. The results are shown in Table 1.

EXAMPLE 10

The procedure of Example 1 was repeated except that the upper glass plate was uniformly heated in an oven at first and then the periphery thereof was further heated by placing a heater at the periphery and heating, thus the upper glass plate having a central temperature of 130° C. and a peripheral temperature of 140° C. The results are shown in Table 1.

REFERENCE EXAMPLE 1

Example 1 was repeated except that the upper glass plate was not heated. The results are shown in Table 1.

TABLE 1

|  | Preheating temp. [°C.] (pheriphery/center) | Plastisol A | | Plastisol B | |
| --- | --- | --- | --- | --- | --- |
|  |  | pheripheral leakage | wrinkle (external appearance) | pheripheral leakage | wrinkle (external appearance) |
| Ex. 1 | 180 | O | Δ | O | Δ |
| Ex. 2 | 160 | O | O | O | Δ |
| Ex. 3 | 140 | Δ | O | O | O |
| Ex. 4 | 120 | — | — | Δ | O |
| Ex. 5 | 200/150 | O | Δ | — | — |
| Ex. 6 | 180/150 | O | O | — | — |
| Ex. 7 | 160/150 | O | O | — | — |
| Ex. 8 | 180/130 | — | — | O | Δ |
| Ex. 9 | 160/130 | — | — | O | O |
| Ex. 10 | 140/130 | — | — | O | O |

TABLE 1-continued

| | Preheating temp. [°C.] (pheriphery/center) | Plastisol A | | Plastisol B | |
|---|---|---|---|---|---|
| | | pheripheral leakage | wrinkle (external appearance) | pheripheral leakage | wrinkle (external appearance) |
| Ref. Ex. 1 | Room temperature | × | ○ | × | ○ |

From Table 1, it is clear that glass laminates prepared by the process of the invention do not show leakage of the plastisol from the periphery thereof, though the prevention of the leakage is not realized when the preheating temperature is low. When the preheating temperature is too high on the other hand, wrinkles are formed on the plastisol film. In conclusion, preferable preheating temperature is in the vicinity of 160° C. in the case of using plastisol A and in the vicinity of 140° C. in the case of using plastisol B. Table 1 also proves that when the upper glass plate has a higher temperature at the periphery than at the center, the plate may have a wide appropriate peripheral temperature range in the temperature side higher than that mentioned above.

REFERENCE EXAMPLE 2

Glass plates each having a size of 200×200×3 mm were used. Each glass plate was coated with plastisol A or plastisol B to form a plastisol layer 4a having a wedge-formed section as shown in FIG. 2 (a) and having a linearly changing thickness of 0.8 mm to 1.4 mm. Another glass plate having a size of 200×200×3 mm was so positioned above the glass plate having the plastisol layer that one of its edge sides was 0.7 mm apart (high) from the edge side, where the thickest part of the plastisol layer existed, of the lower glass plate, and that it was inclined to make an angle of 14 degree with the lower glass plate. The upper glass plate was then gradually declined over a period of about 10 seconds with force on the plastisol layer on the lower glass plate to become parallel to the lower glass plate.

Ten pieces of such glass laminates were prepared for each plastisol, and whether or not bubbles were formed in the plastisol was visually observed. The results are shown in Table 2. Numerals listed in Table 2 denote the number of rejected laminates.

REFERENCE EXAMPLE 3

The procedure of Reference Example 2 was repeated except that the lower glass plate was coated with plastisol A or plastisol B to have a plastisol layer as shown in FIG. 2 (b) and having a curvilinearly changing thickness of 0.8 to 1.4 mm, and that both glass plates were laminated together with the intermediate plastisol layer by placing the upper glass plate in parallel with the lower glass plate from the first, and pressing it downwardly. The results are shown in Table 2.

COMPARATIVE EXAMPLE 1

Reference Example 3 was repeated except that the lower glass plate was coated with plastisol A or plastisol B to form a plastisol layer having a uniform film thickness of 0.8 mm.

The results are shown in Table 2.

TABLE 2

| | Plastisol A | Plastisol B |
|---|---|---|
| Comp. Ex. 1 | 10 | 10 |
| Ref. Ex. 2 | 0 | 0 |

TABLE 2-continued

| | Plastisol A | Plastisol B |
|---|---|---|
| Ref. Ex. 3 | 1 | 0 |

What is claimed is:
1. A process for producing laminated glass which comprises:
coating a film-forming plastisol on a surface of a first glass plate which is at a temperature below a gelation temperature of said plastisol to form a layer of the plastisol so that the thickness of the layer with respect to the transfer direction gradually increases (or decreases) from the one side to the other side of the surface or the thickness of the layer with respect to the transfer direction gradually increases (or decreases) from the one side to the central part and then decreases (or increases) from the central part to the other side of the surface,
heating a second glass plate to a predetermined temperature at or above a temperature at which gelation of the plastisol occurs,
bringing the second glass plate which has been heated to the predetermined temperature in contact with the layer of the plastisol formed on the first glass plate first at a portion where the layer is the thickest and thereafter at portions where the layer is thinner, thereby gradually laminating the glass plates to each other while causing the plastisol to lose its fluidity at portions where it comes in contact with the heated second glass plate, whereby, leakage of plastisol around edge portions of the glass plates is prevented, and
heating the laminated glass plates under pressure so that the plastisol gelates.
2. A process for producing laminated glass which comprises:
coating a film-forming plastisol on a surface of a first glass plate which is at a temperature below a gelation temperature of said plastisol to form a layer of the plastisol so that the thickness of the layer with respect to the transfer direction gradually increases (or decreases) from the one side of the surface to the other side or the thickness of the layer with respect to the transfer direction gradually increases (or decreases) from the one side to the central part and then decreases (or increases) from the central part to the other side of the surface,
heating a second glass plate to a predetermined temperature at or above a temperature at which gelation of the plastisol occurs,
bring the second glass plate of which peripheral portions have been heated to the predetermined temperature in contact with the layer of the plastisol formed on the first glass plate first at a portion where the layer is the thickest and thereafter at portions where the layer is thinner, there gradually laminating the glass plates to each other while causing the plastisol to lose its fluidity at portions where it comes in contact with the heated second glass plate, whereby, leakage of plastisol around edge portions of the glass plates is prevented, and heating the laminated glass plates under pressure so that the plastisol gelates.

3. The process for producing laminated glass according to claim 1 or 2 wherein the plastisol is based on an epoxy group-containing vinyl chloride resin having a polymerization degree of from about 600 to 3000 and an epoxy resin content of at least 0.5% by weight.

4. The process for producing laminated glass according to claim 3 wherein the second glass plate has been heated at least at its peripheral portions to a temperature of 100° to 200° C.

5. An apparatus for producing laminated glass which comprises:

a means for coating a film-forming plastisol on a surface of a first glass plate which is at a temperature below a gelation temperature of said plastisol to form a layer of the plastisol so that the thickness of the layer with respect to the transfer direction gradually increases (or decreases) from the one side to the other side of the surface or the thickness of the layer with respect to the transfer direction gradually increases (or decreases) from the one side to the central part and then decreases (or increases) from the central part to the other side of the surface, heating a second glass plate to a predetermined temperature at or above a temperature at which gelation of the plastisol occurs, a means for bringing the second glass plate which has been heated to the predetermined temperature in contact with the layer of the plastisol formed on the first glass plate first at a portion where the layer is the thickest and thereafter at portions where the layer is thinner, thereby gradually laminating the glass plates to each other while causing the plastisol to lose its fluidity at portions where it comes in contact with the heated second glass plate, whereby, leakage of plastisol around edge portions of the glass plates is prevented, and a means for heating the laminated glass plates under pressure so that the plastisol gelates.

6. An apparatus for producing laminated glass which comprises:

a means for coating a film-forming plastisol on a surface of a first glass plate which is at a temperature below a gelation temperature of said plastisol to form a layer of the plastisol so that the thickness of the layer with respect to the transfer direction gradually increases (or decreases) from the one side to the other side of the surface or the thickness of the layer with respect to the transfer direction gradually increases (or decreases) from the one side to the central part and then decreases (or increases) from the central part to the other side of the surface, heating a second glass plate to a predetermined temperature at or above a temperature at which gelation of the plastisol occurs, a means for bringing the second glass plate of which peripheral portions have been heated to the predetermined temperature in contact with the layer of the plastisol formed on the first glass plate first at a portion where the layer is the thickest and thereafter at portions where the layer is thinner, thereby gradually laminating the glass plates to each other while causing the plastisol to lose its fluidity at portions where it comes in contact with the heated second glass plate, whereby, leakage of plastisol around edge portions of the glass plates is prevented, and a means for heating the laminated glass plates under pressure so that the plastisol gelates.

* * * * *

UNITED STATES PATENT AND TRADEMARK OFFICE
CERTIFICATE OF CORRECTION

PATENT NO. : 5,118,371
DATED : June 2, 1992
INVENTOR(S) : Toshihiko Hori and Eitaro Nakamura It is certified that error appears in the above-identified patent and that said Letters Patent is hereby corrected as shown below:

On the Title page, item [57]:

Abstract Line 11 "is" should read --it--.

Column 3 Line 62 after "plate" insert --1--.

Column 7 Line 43 "di-noctyltin" should read --di-n-octyltin--.

Claim 2 Line 60 Column 12 "bring" should read --bringing--.

Claim 2 Line 65 Column 12 "there" should read --thereby--.

Signed and Sealed this

Thirty-first Day of August, 1993

Attest:

BRUCE LEHMAN

Attesting Officer     Commissioner of Patents and Trademarks